United States Patent [19]

Shibata et al.

[11] Patent Number: 5,471,265
[45] Date of Patent: Nov. 28, 1995

[54] METHOD OF MAKING PHOTOGRAPHS OF DIFFERENT ASPECT RATIOS AND A PHOTOGRAPHIC FILM CARTRIDGE, A CAMERA AND A PHOTOGRAPHIC PRINTER FOR USE IN PRACTICING THE METHOD

[75] Inventors: Tadayoshi Shibata; Nakao Oi, both of Kanagawa, Japan

[73] Assignee: Fuji Photo Film Co., Ltd., Kanagawa, Japan

[21] Appl. No.: 912,714

[22] Filed: Jul. 13, 1992

[30] Foreign Application Priority Data

Jul. 11, 1991 [JP] Japan .................. 3-197118

[51] Int. Cl.⁶ .............. G03B 13/10; G03B 17/24; G03B 27/32; G03B 29/00
[52] U.S. Cl. .............. 354/76; 354/106; 354/222; 355/40
[58] Field of Search .............. 354/76, 105, 106, 354/222, 275, 210, 215; 355/40, 41; 430/501

[56] References Cited

U.S. PATENT DOCUMENTS

| | | | |
|---|---|---|---|
| Re. 32,797 | 12/1988 | Harvey | 354/106 X |
| 2,024,627 | 12/1935 | Crabtree | 430/501 |
| 4,370,409 | 1/1983 | Bostroem | 430/501 X |
| 4,583,831 | 4/1986 | Harvey | 354/106 |
| 4,862,201 | 8/1989 | Taniguchi et al. | 354/105 |
| 5,066,971 | 11/1991 | Kodaira | 354/159 X |
| 5,093,684 | 3/1992 | Crochetierre et al. | 355/40 |
| 5,132,715 | 7/1992 | Taillie | 354/105 |
| 5,151,726 | 9/1992 | Iwashita et al. | 355/40 X |
| 5,204,707 | 4/1993 | Harvey | 354/106 X |

FOREIGN PATENT DOCUMENTS

| | | |
|---|---|---|
| 54-26721 | 2/1979 | Japan . |
| 64-544 | 1/1989 | Japan . |

*Primary Examiner*—Russell E. Adams
*Assistant Examiner*—J. K. Han
*Attorney, Agent, or Firm*—Young & Thompson

[57] ABSTRACT

In a camera, one of a plurality of predetermined print aspect ratios is selected for each scene by manual operation of a print mode selection switch, and mechanically readable data representing the print aspect ratio is thereby recorded on the photographic film for each original frame during photographing. The original frames are recorded at a constant taking aspect ratio in the same size on the photographic film. During printing, the trimming data is read from the photographic film, and a part of the original frame that excludes both lateral sides of the original frame is printed based on the trimming data, so as to make a photographic print having the selected print aspect ratio. The camera is provided with a device for changing the field of view, that cooperates with the print mode selection switch, so as to change the aspect ratio of the field of view in accordance with the selected aspect ratio. The photographic film has been previously recorded with several pairs of marks, each pair indicating lateral side border lines of a trimming range which corresponds to one of the predetermined selectable print aspect ratios. A visible mark corresponding to one of the previously recorded marks that indicate the trimming range selected for each original frame, is also recorded on the photographic film during photographing.

30 Claims, 8 Drawing Sheets

METHOD OF MAKING PHOTOGRAPHS OF DIFFERENT ASPECT RATIOS AND A PHOTOGRAPHIC FILM CARTRIDGE, A CAMERA AND A PHOTOGRAPHIC PRINTER FOR USE IN PRACTICING THE METHOD

BACKGROUND OF THE INVENTION

1. Field of the Invention

The present invention relates to a method of making photographs, and more particularly to a method of making photographs at a variety of aspect ratios. The present invention further relates to a photographic system for use in practicing the method, the photographic system including a photographic film cartridge, a camera and a photographic printer.

2. Related Art

Recently, there have appeared on the market 135-type full-size frame format compact cameras, in which the picture frames can be printed in a panoramic size. Fuji "Cardia Travel Mini"™ is one of such compact cameras, which has an exposure opening for defining the exposure area of photographic film that corresponds to a full-size frame of 135-type film, that is, 24 mm ×36 mm in size (aspect ratio 1.5).

The exposure opening is used for standard photography. When the photographer wishes to take pictures of panoramic size, a pair of mask plates are inserted to limit the upper and lower margins of the exposure opening. As a result, a horizontally elongated exposure area of 13 mm×36 mm in size (aspect ratio= about 2.8) is provided. Using such an original frame taken through the elongated exposure opening, an elongated panoramic print of 89 mm×254 mm in size (aspect ratio of about 2.9) can be made.

With the increase in popularity of the above-described photographic system, there has been an increasing demand for a variety of print sizes. Especially because the photograph can be given a wide expanse and depth of the scene by enlarging the aspect ratio, the possibility of varying the aspect ratio generates new interest in such photography.

However, in the above-described conventional photographic system, the panoramic print of 89 mm×254 mm is made from an original frame of 13 mm×36 mm by using a high magnification factor of about 7, which is considerably greater than the magnification factor for the standard size print of 89 mm×127 mm, which latter has a magnification factor of about 3.6. As a result, the panoramic prints tend to be inferior to the standard prints as to picture quality.

Moreover, in the above-described photographic system, it is possible to provide only two aspect ratios, that is, an aspect ratio 1.4 for standard prints and an aspect ratio 2.9 for panoramic prints. Therefore, there is a problem that neither the standard aspect ratio nor the panoramic aspect ratio is suitable for some scenes. Of course, it is in principle possible to make a photographic print of a reasonably satisfactory aspect ratio if the customer orders such a special aspect ratio. However, according to this method, it is difficult to offer the general public photographic prints with a variety of aspect ratios. Furthermore, this method is expensive.

SUMMARY OF THE INVENTION

In view of the foregoing, a primary object of the invention is to provide a method of making photographs, by which photographic prints having any of a variety of aspect ratios can be made without lowering the quality of the pictures.

Another object of the invention is to provide a low-cost photographic system for use in making such photographs.

To achieve the above objects, according to a method of the invention, a print aspect ratio is selected for each scene, and trimming data representing the print aspect ratio are recorded on the photographic film for each original frame during photographing. A photographic printer reads the trimming data from the photographic film, but prints any original frame at a constant magnification onto photographic paper, independently of the print aspect ratio represented by the trimming data, so as to make a photographic print having the print aspect ratio and a constant height in a direction widthwise of the photographic paper.

According to the method of the invention, it becomes possible to make photographic prints of different aspect ratios from a strip of photographic film. Therefore, the requirement for variation of the print size can be satisfied.

Because the original frames are printed at a constant magnification onto photographic paper having a constant width, independently of the print aspect ratio designated for that original frame, it is possible to maintain a high quality of picture for any aspect ratio.

Moreover, a photographic printer for use in practicing the invention can be provided by retrofitting a conventional photographic printer at a low cost.

According to a preferred embodiment of the invention, the original frames are recorded at a constant taking aspect ratio in the same size on the photographic film. When printing, the photographic paper is masked on both lateral sides so as to leave a printing area having the print aspect ratio selected for each original frame. The original frame is also masked in accordance with the print aspect ratio selected for the original frame, during printing.

According to a further preferred embodiment, the field of view of the viewfinder of the camera is masked on both lateral sides, in accordance with the selected aspect ratio.

By providing a camera with a print mode selection device for recording the trimming data of the selected aspect ratio on the photographic film, and a device that cooperates with the print mode selection device so as to change the field of view of the viewfinder in accordance with the selected aspect ratio, it becomes possible to designate the trimming range while confirming the photographic field to be printed in the selected print mode by viewing only the selected field through the viewfinder.

By previously recording on the photographic film marks indicating several trimming ranges which correspond to a plurality of predetermined selectable print aspect ratios, it becomes possible to visually recognize on the developed film the trimming range selected for each original frame.

BRIEF DESCRIPTION OF THE DRAWINGS

The above and other features of the present invention will become apparent from the following detailed description of the preferred embodiments when read in connection with the accompanying drawings, wherein like reference numerals designate like parts throughout the several views, and wherein.

DETAILED DESCRIPTION OF THE PREFERRED EMBODIMENTS

Figure 1:
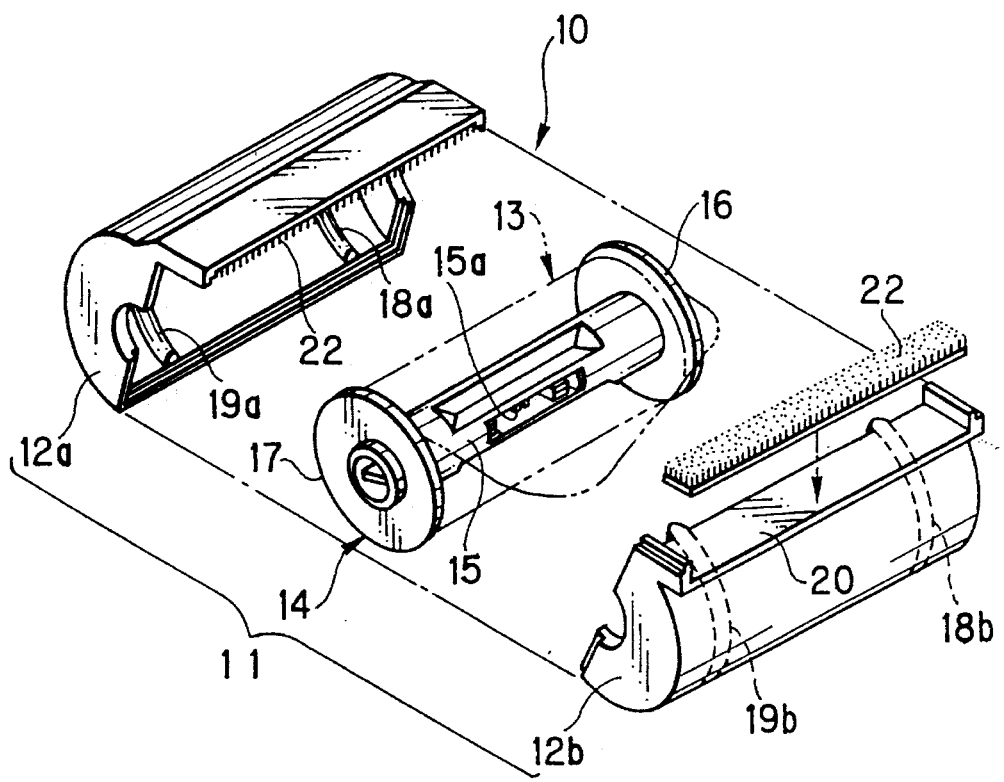
FIG. 1 is an exploded perspective view of a photographic film cartridge according to an embodiment of the invention.

FIG. 1 shows a photographic film cartridge 10 according to an embodiment of the invention, wherein the photographic film cartridge (hereinafter refereed to simply as the cartridge) includes a cartridge shell 11 comprised by a pair of shell halves 12a and 12b, a strip of photographic film 13 (hereinafter referred to as film 13) having a width of 26 mm, and a spool 14 for winding the film 13 thereon.

The spool 14 includes a spool shaft 15 and a pair of flanges 16 and 17 secured to opposite ends of the spool shaft 15. The ends of the spool shaft 15 are exposed to the outside of the cartridge shell 11. The spool shaft 15 is formed with an engaging portion 15a for engaging an end of the film 13 with the spool 14. The shell halves 12a and 12b have pairs of ribs 18a and 19a; 18b and 19b each, which are formed on the inner walls of the shell halves 12a and 12b. The ribs 18a, 18b, 19a and 19b contact the outermost convolution of the film 13 at both side edges thereof which are not used for recording pictures, so as to prevent the unwinding of the film 13 wound on the spool 14.

Furthermore, one rib 19b that is formed on the shell half 12b, has a separation claw formed integrally therewith near a film outlet 20 of the cartridge 10. The separation claw is for peeling off the leading end of the film 13 to guide it to the film outlet 20. In order to shield the interior of the cartridge 10 from external light, light-trapping members 22 are cemented onto wall portions of the shell halves 12a and 12b that form the film outlet 20.

Figure 2:
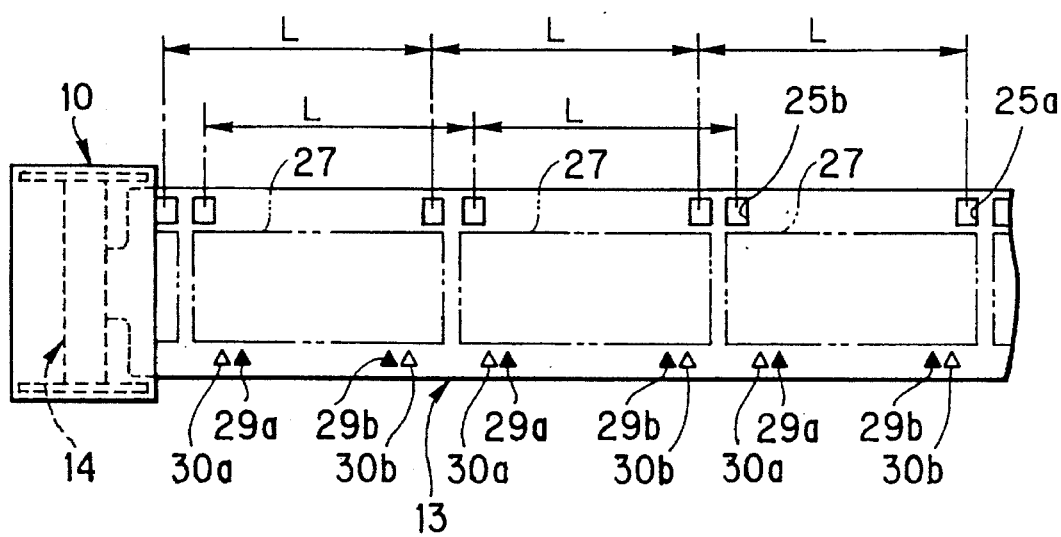
FIG. 2 is a schematic view of a photographic film contained in the photographic film cartridge of FIG. 1.

As shown in FIG. 2, the film 13 is provided with a plurality of perforations 25 aligned in a lengthwise direction of the film 13 in the upper edge of the film. The film 13 also has triangular marks 29a, 29b, 30a and 30b photographically prerecorded on the lower edge of the film 13, wherein two pairs of the triangular marks 29a and 29b; 30a and 30b are allocated for indicating two different trimming ranges for each frame recording area 27, all of which areas 27 are of constant size. The perforations 25 are formed from the beginning of the film 13 and are arranged at intervals L corresponding to the intervals of the frame recording area 27 (L=about 36.5 mm), so as to detect the position of the respective frame recording areas 27 in a camera or a photographic printer, with reference to the perforations 25.

According to this arrangement of the perforations 25, each frame recording area 27 can have a frame size of about 15 mm ×34.8 mm ( aspect ratio=about 2.3), that is, the cinemascope size.

One pair of the triangular marks 29a and 29b, that is, the black triangular marks, is disposed on opposite lateral sides of the center line of each frame recording area 27, each mark being at a distance of 10.8 mm from this center line. The other pair of the triangular marks 30a and 30b, that is, the white triangular marks, is disposed on opposite lateral sides of the center line of each frame recording area 27 each at a distance of 13.4 mm from this center line.

The cartridge 10 can wind the entire length of the film 13 into the cartridge shell 11 by rotating the spool 14 in a winding direction, and also can advance the leading end of the film 13 to the outside of the cartridge shell 11 by rotating the spool 14 in an unwinding direction opposite to the winding direction. Because of the small width 26 mm of the film 13, the cartridge 10 is smaller than a conventional 135-type film cartridge containing photographic film of 35 mm width. However, the width of the film 13 may be other than 26 mm.

Figure 3:
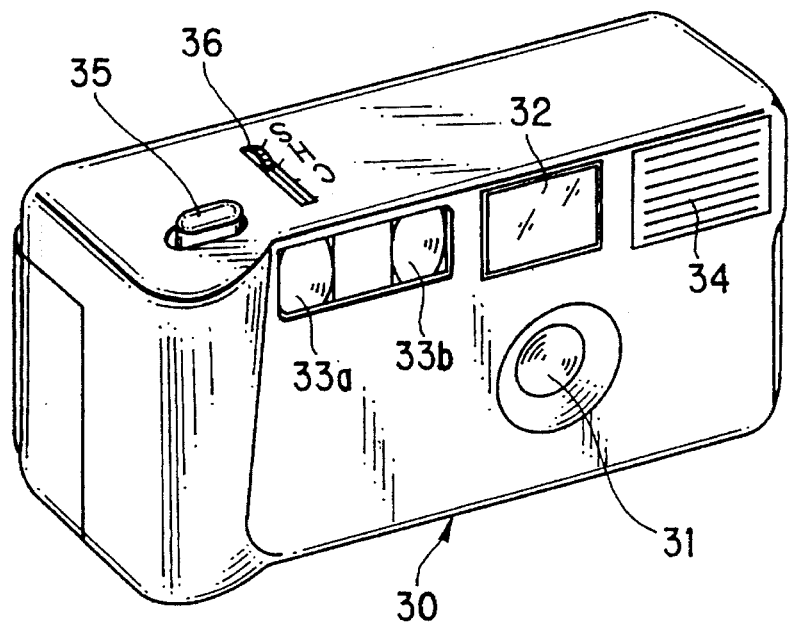
FIG. 3 is a perspective view of a camera embodying the invention.

FIG. 3 shows a camera 30 which is adapted to use the above-described cartridge 10. The camera 30 has a taking lens 31 in the center of the front, a viewfinder 32 above the taking lens 31, rangefinder windows 33a and 33b on the upper left side of the front, and a flash window 34 on the upper right side of the front.

The camera 30 also has a shutter button 35 and a print mode selection switch 36 on the top wall thereof. The print mode selection switch 36 is operated before the shutter release, for selecting one of three predetermined print modes "S", "H" and "C". In this embodiment, the print mode selection switch 36 can be slid between three positions corresponding to the three print modes "S", "H" and "C".

The print mode "S" is a standard frame mode for designating the trimming needed to make a photographic print of 15 mm×21.6 mm size ( aspect ratio 1.5) from the original frame recorded in the whole frame recording area 27, that is, 15 mm×34.8 mm in size (aspect ratio 2.3). The print mode "H" means an HDTV (high definition television) size mode for designating the trimming needed to make a photographic print of 15 mm×26.8 mm size (aspect ratio 1.8) from the picture recorded in the whole frame recording area 27. The print mode "C" means a cinemascope size mode for designating a full print to make a photographic print of 15 mm×34.8 mm size ( aspect ratio 2.3) from the picture recorded in the whole recording area 27. The aspect ratio 1.8 of the HDTV size mode is substantially equal to the aspect ratio of a standard screen of a high definition television, that is, about 1.8.

Figure 4:
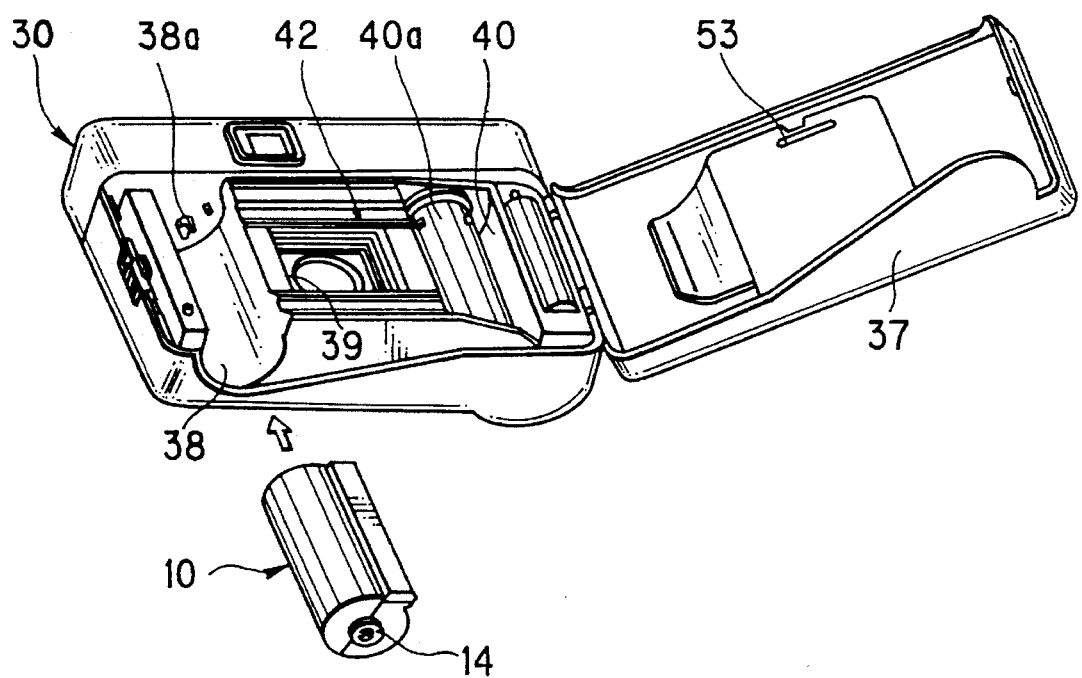
FIG. 4 is an exploded rear perspective view of the camera of FIG. 3 with the rear cover opened.

As shown in FIG. 4, the camera 30 has a cartridge chamber 38 which is opened by opening a rear cover 37 of the camera 30. The cartridge 10 is inserted into the cartridge chamber 38 from the bottom thereof in the axial direction. The cartridge chamber 38 is provided with a coupling fork 38a which is coupled to the spool 14 when the cartridge 10 is inserted in the cartridge chamber 38, so that the film 13 can be fed out from and wound back into the cartridge by rotating the coupling fork 38a. The film 23 fed out from the cartridge 13 is transported through an exposure opening 39 and is wound about a reel 40a in a film take-up chamber 40.

The exposure opening 39 is 15 mm×34.8 mm in size, the lengthwise direction of which corresponds to the film transporting direction. A photo sensor 42 is disposed above the exposure opening 39, for detecting the perforations 25 of the film 13. Based on a signal detected by the photo sensor 42, the respective frame recording areas 27 are properly positioned in the exposure opening 39. The camera 30 is smaller than a conventional 135-film format camera, because the cartridge 10 is smaller than the conventional 135-type film cartridge.

Figure 5:
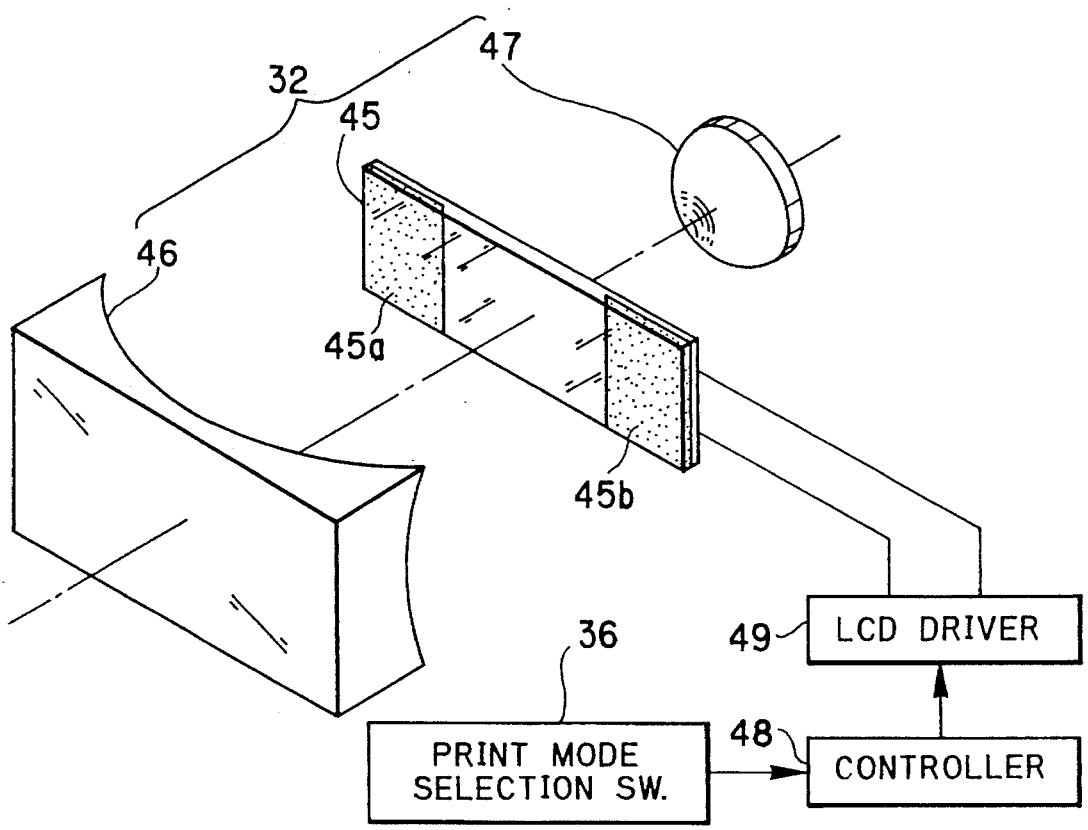
FIG. 5 schematically shows the construction of the viewfinder of the camera of FIG. 3.

The camera 30 changes the field of view of the viewfinder 32 in accordance with the selected one of the print modes "S", "H" and "C". FIG. 5 schematically shows the viewfinder 32. As shown, the viewfinder 32 is an inverted Galilean finder in which an LCD 45 is disposed between an objective lens 46 and an ocular 47. According to a signal corresponding to one of the three print modes "S", "H" and "C", that is outputted from the print mode selection switch 36, a controller 48 of the camera causes the LCD 45 to display opaque areas 45a and 45b made of a plurality of light-shielding lines.

The opaque lines 45a and 45b are disposed on both lateral sides of the LCD 45 so as to limit the view field of the viewfinder 32 in the lateral or horizontal direction symmetrically with respect to the center line of the viewfinder. As a result, the aspect ratio of the view field is changed between the above-described three values "2.3", "1.8" and "1.5", in accordance with the selected print mode.

Specifically, by setting the print mode selection switch 36 in the positions S, H and C, the viewfinder 32 is set to the same aspect ratio as that of the standard size, the HDTV size or the cinemascope size, respectively. In this way, the photographer can recognize the photographic field to be contained in the finished print, while looking through the viewfinder 32 to frame the photographic field.

Figure 6:
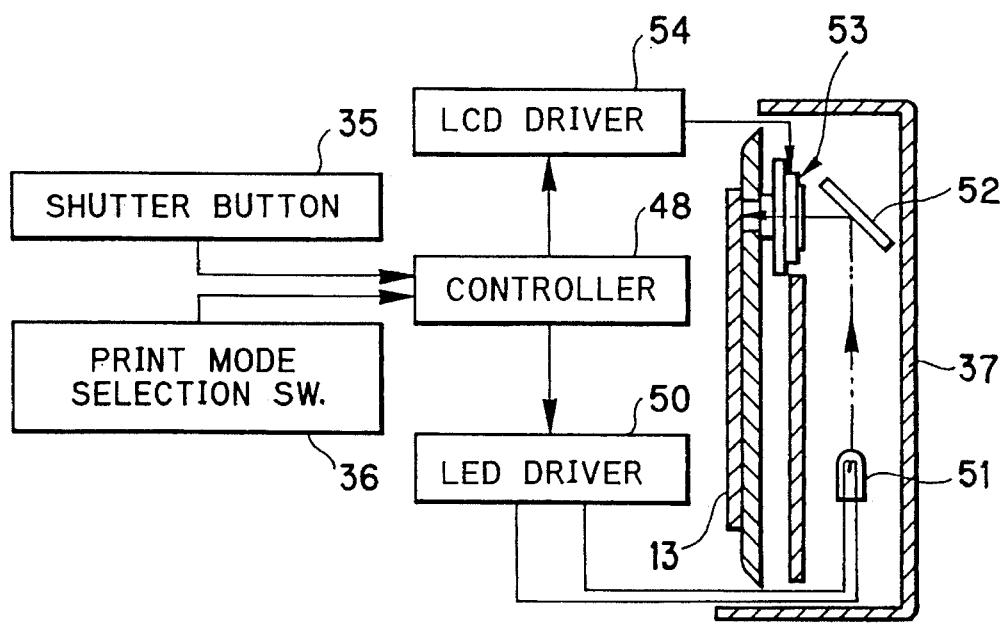
FIG. 6 schematically shows the construction of the trimming data recording section of the camera.

Furthermore, the camera 30 records data corresponding to the selected print mode on the film 13, on a portion below the frame recording area 27 placed in the exposure opening 39, each time a picture is taken. As shown in FIG. 6, a trimming data recording device is incorporated in the rear cover 37 of the camera 30. In the trimming data recording device, an LED driver 50 is controlled by the controller 48 for energizing an LED 51 to emit light when the controller 48 receives a shutter release signal. The LED 51 illuminates an LCD 53 through a mirror 52. The LCD 53 is driven by an LCD driver 54 to display a triangular mark and/or a bar code in accordance with the selected print mode.

Figure 7:
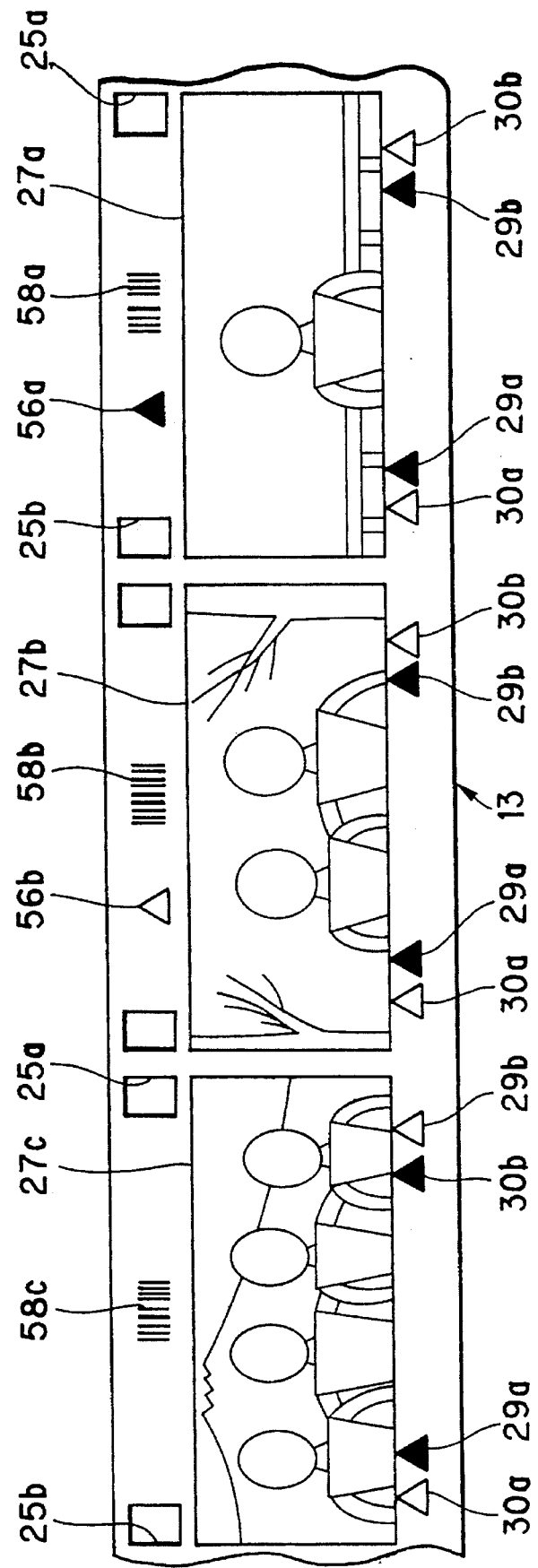
FIG. 7 is an example of a photographic film exposed by the camera of the invention.

As a result, a triangular mark 56a or 56b and/or a bar code 58a, 58b or 58c are photographically recorded on the back of the film 13 for each original frame 27a, 27b or 27c in a manner as shown in FIG. 7. Specifically, when the print mode selection switch 36 is set in the position "S" corresponding to the standard size mode, one black triangular mark 56a and one bar code 58a corresponding to the standard size mode are recorded above each original frame 27a, 27b and 27c taken in this condition. On the other hand, when the print mode selection switch 36 is set in the position H corresponding to the HDTV size mode, one white triangular mark 56b and one bar code 58b corresponding to this mode are recorded in the same way. When the print mode selection switch 36 is set in the position C corresponding to the cinemascope size mode, only a bar code 58c corresponding to this mode is recorded.

In this way, the black triangular mark 56a recorded during photographing corresponds to the pair of black triangular marks 29a and 29b that indicate the trimming range for the standard size. The white triangular mark 56b recorded during photographing corresponds to the pair of white triangular marks 30a and 30b that indicate the trimming range for the HDTV size. By reference to these triangular marks, it is possible to confirm the trimming ranges of the respective original frames 27a, 27b and 27c on the developed film. The bar codes 58a and 58c are used for mechanically reading the trimming data of each original frame 27a, 27b or 27c by a photographic printer, as set forth below.

Figure 8:
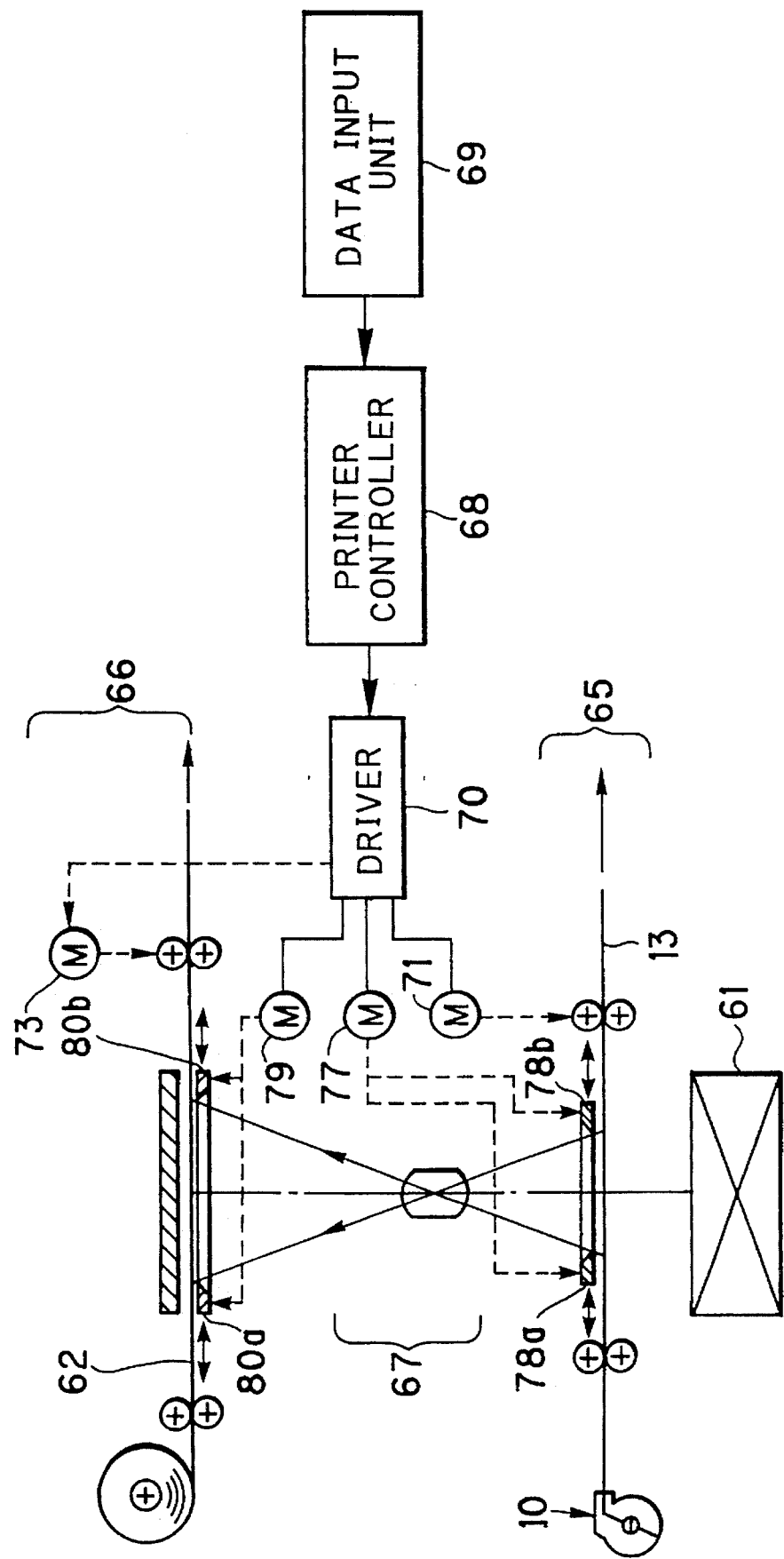
FIG. 8 schematically shows a photographic printer embodying the invention, viewed edgewise of the film.

The cartridge 10 containing a film 13 exposed by the above-described camera 30 is forwarded to a photofinisher. At the photofinisher, the film 13 is removed from the cartridge shell 11 to be developed. The developed film is again wound into the cartridge shell 11, and is set in a predetermined position in a photographic printer as shown in FIG. 8. The photographic printer prints the respective original frames 27a, 27b and 27c recorded with the trimming data on the developed film 13, at a constant magnification, on photographic paper 62 having a constant width.

The photographic printer is comprised by a film transportation section 65, a paper transporting section 66, an optical system 67, a printer controller 68 and a data input unit 69. The film transportation section 65 controls a motor 71 and a motor 73 through a driver 70 in accordance with signals from the printer controller 68, so as to transport the film and photographic paper 62, respectively. The optical system 67 has a constant magnification factor of about 5.9 for enlargement.

Figure 9:
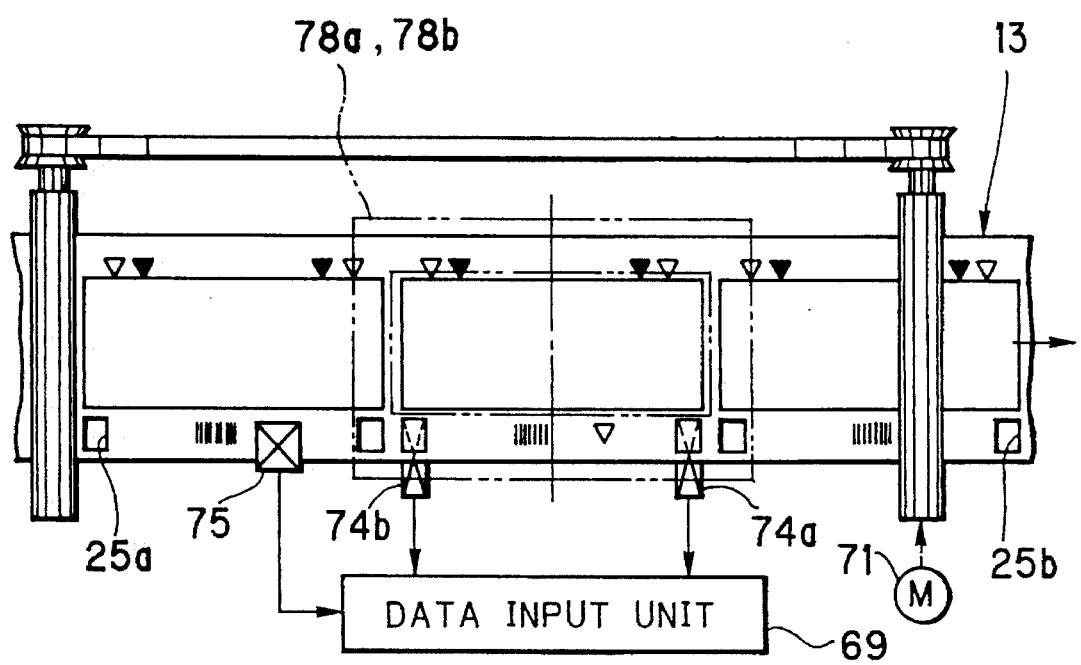
FIG. 9 shows a portion of the photographic printer, viewed broadside of the film.

Furthermore, the film transporting section 65 is provided with a pair of photo sensors 74a and 74b for positioning each original frame 27a, 27b or 27c of the film 13 at a predetermined position in the printing light path, and a bar code reader 75 disposed before the predetermined position, as shown in FIG. 9. Trimming data detected by the photo sensors 74a and 74b and the bar code reader 75 are sent to the printer controller 68 through the data input unit 69.

When both the photo sensors 74a and 74b detect the perforations 25 of the film 13 simultaneously, the printer controller 68 controls the film transporting section 65, so as to stop transporting the film 13. At the same time, the printer controller 68 controls a motor 77 through the driver 70, so as to change the position of a pair of film masks 78a and 78b, in accordance with the trimming data. The film masks 78a and 78b are movable in directions opposite to each other and parallel to the film transporting direction, so as to mask the original frame 27a, 27b, 27c on both lateral sides theroef, in accordance with the trimming data.

Furthermore, the printer controller 68 controls a motor 79 through the driver 70 so as to change the position of a pair of printing paper masks 80a and 80b, in accordance with the trimming data. The printing paper masks 80a and 80b are movable in directions opposite to each other and parallel to the film transporting direction, so as to mask the photographic paper on both lateral sides of each printing area thereof, in accordance with the trimming data. The printer controller 68 also controls the paper transporting section 66 so as to change the transported amount of the photographic paper 62 in accordance with the trimming data.

Figure 10A:
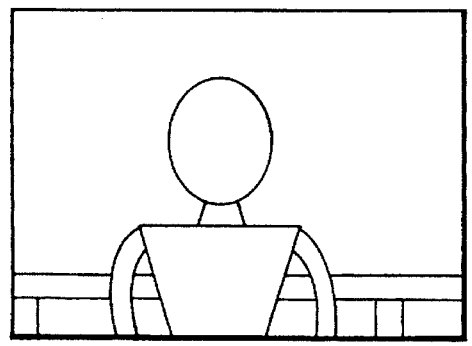
FIGS. 10A, 10B and 10C show examples of photographic prints which are made using the photographic printer of FIG. 8.
Figure 10B:
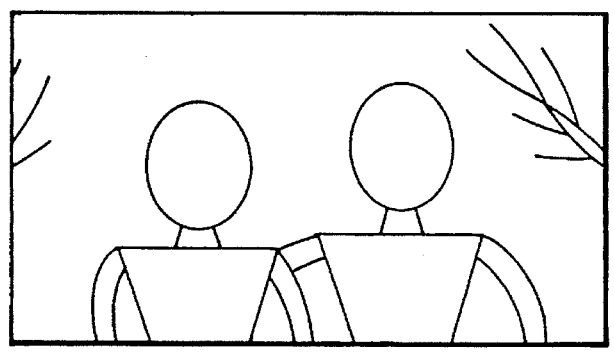
Figure 10C:
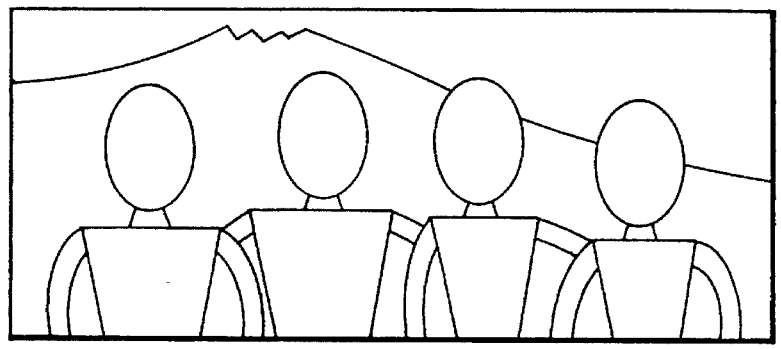

FIGS. 10A, 10B and 10C shows examples of prints made from the film 13 of FIG. 7 using the above-described photographic printer. As can be seen, the prints are equal in height but are different in aspect ratio to each other. Specifically, the photographic print of FIG. 10A that is 89 mm×127 mm in size (aspect ratio 1.5) is provided from the original frame 27a with trimming data 56a and 58a for the standard size. The photographic print of FIG. 10B that is 89 mm×158 mm in size (aspect ratio 1.8) is provided from the original frame 27b with trimming data 56b and 58b for the HDTV size. The photographic print of FIG. 10C that is 89 mm×205 mm in size (aspect ratio 2.3) is provided from the original frame 27c with trimming data 58c for the cinemascope size.

Figure 11:
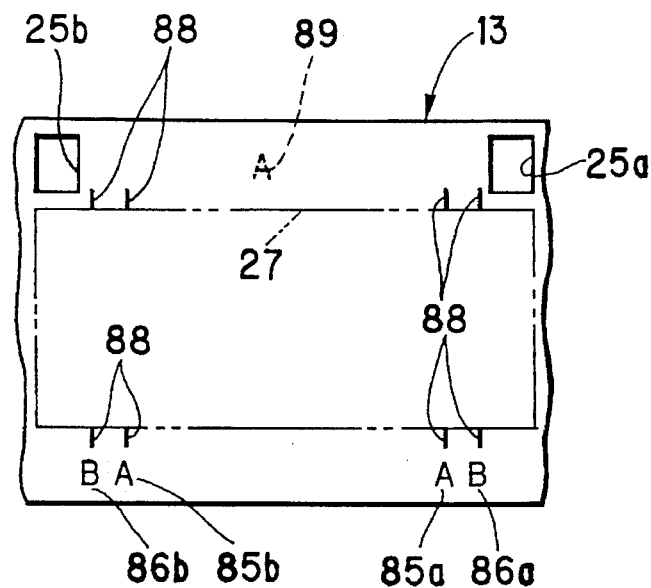
FIG. 11 shows another embodiment of photographic film of the invention.

It is, of course, possible to make photographic prints of different size or different aspect ratio from a same original frame, disregarding the trimming data allocated thereto. Furthermore, the triangular marks 29a, 29b, 30a and 30b which are previously recorded photographically on the film 13 for indicating trimming ranges, may be other marks. For example, marks 85a, 85b, 86a, 86b and 88 shown in FIG. 11 may be recorded on the film 23, instead. These marks include two pairs of characters AA and BB, and partition lines 88.

The marks "A,A" 85a and 85b indicate the trimming position for the standard frame size, wherein the picture area between the partition lines 88 disposed above these marks "A,A" is to be printed. The marks "B,B" 86a and 86b indicate the trimming position for the HDTV size, wherein the picture area between the partition lines 88 disposed above these marks "B,B" is to be printed. When a character "A" is recorded for the original frame as trimming data 89, the original frame is printed in the standard size, whereas when a character "B" is recorded as the trimming data 89, a photographic print of the HDTV size is to be made. If no character is recorded as the trimming data for an original frame, it means that a full print, i.e. a photographic print of the cinemascope size, is to be made.

It is, of course, possible to provide marks "C,C" and corresponding partition lines for indicating both lateral margins of the cinemascope size. Thereby, a character "C" is recorded as the trimming data for designating a full print.

Although a pair of perforations 25 are allocated to each frame recording area 27, it is possible to allocate a single perforation or three or more perforations to each frame recording area 27.

Figure 12:
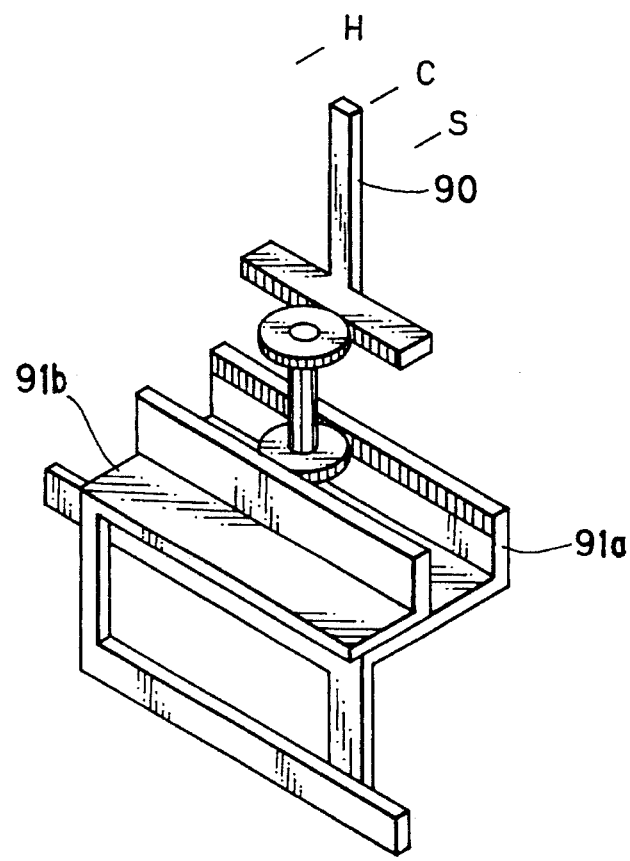
FIG. 12 shows a viewfinder and a field of view changing member according to another embodiment of the invention.

According to another embodiment of the invention, the viewfinder 32 may have a mechanism for changing the field of view, as shown in FIG. 12, in place of the LCD 45 disposed in the inverted Galilean finder. This changing mechanism includes a trimming range selection lever 90 and a pair of masks 91a and 91b movable in cooperation with the trimming range selection lever 90, so as to limit the size of the field of view in the horizontal direction by masking out both lateral sides thereof, in accordance with the selected trimming range.

This embodiment is preferable for applying the invention to inexpensive cameras or to lens-fitted photographic film packages as disclosed in Japanese Laid-Open Patent Appln. No. 65-544.

In place of the trimming data recording device shown in FIG. 6, it is possible to use LEDs or light entering through the taking lens 31 for photographically recording the trimming data of the selected print mode. It is also possible to record a pair of marks, such as triangular marks, as the trimming data in the positions indicating the trimming range corresponding to the selected print mode. In this case, it is unnecessary to pre-record the marks 29a, 29b, 30a and 30b.

The data as to the selected print mode may be magnetically recorded on the film 13 by using a magnetic recording head, whereupon it is necessary to provide a substantially transparent magnetic recording layer on the film 23. Furthermore, the camera 30 may have an IC memory chip and a recording device for recording the data of the selected print mode for each original frame in the IC memory chip.

Needless to say, the aspect ratio and the print size may have other values than the above-described values.

Although the present invention has been described in detail above with reference to preferred embodiments shown in the drawings, it will be apparent to those skilled in the art that various changes and modifications of the present invention are possible within the scope of the following claims.

What is claimed is:

1. A method of making photographs comprising:
   A. selecting a print aspect ratio of a photographic print to be made from an original frame before photographing said original frame on photographic film;
   B. recording trimming data on said photographic film during photographing said original frame, said trimming data representing said selected print aspect ratio;
   C. developing the exposed film;
   D. reading said trimming data from said photographic film after development; and thereafter
   E. making a photographic print by printing onto photographic paper said original frame at a constant magnification, independently of the selected print aspect ratio represented by said trimming data, said photographic print having said selected print aspect ratio and a constant dimension in the direction of the width of said photographic paper, regardless of the selected print aspect ratio, wherein said step E includes masking said photographic paper so as to leave a printing area having said selected print aspect ratio, said printing area being disposed in a printing light path.

2. A method as claimed in claim 1, wherein said original frame has a predetermined constant taking aspect ratio regardless of said selected print aspect ratio.

3. A method as claimed in claim 2, further comprising the step of photographically recording plural pairs of visible border marks for each original frame, on said film but outside said original frame, in a factory, one pair of said border marks being different from another pair, and each said pair indicating both lateral side border lines of one of a plurality of predetermined trimming ranges, each said trimming range corresponding to one of said predetermined print aspect ratios that is less than said taking aspect ratio.

4. A method as claimed in claim 3, wherein said trimming data further include a visible mark, said visible mark corresponding to one pair of said border marks that indicates a selected one of said predetermined trimming ranges, so as to indicate visually said selected trimming range on said photographic film after development.

5. A method as claimed in claim 1, wherein said trimming data include mechanically readable data.

6. A method as claimed in claim 5, wherein said mechanically readable data is a bar code.

7. A method as claimed in claim 1, wherein said step E further includes the step of:
   masking said original frame on both lateral sides thereof in accordance with said selected print aspect ratio designated by said trimming data.

8. A method as claimed in claim 1, wherein said steps A and B are performed in a camera.

9. A method as claimed in claim 8, further comprising the step of:
   masking both lateral sides of a field of view in a viewfinder of said camera, so as to correspond to said selected print aspect ratio.

10. A method as claimed in claim 1, wherein there are a plurality of predetermined print aspect ratios, one of which is selectable in said selecting step A.

11. A photographic system for making photographs comprising:
   a camera, and a photographic printer;

selecting means for selecting a print aspect ratio of a photographic print to be made from an original frame before photographing said original frame on photographic film;

recording means for recording trimming data on said photographic film during photographing said original frame, said trimming data representing said selected print aspect ratio;

reading means for reading said trimming data on said photographic film after development;

printing means for making a photographic print having said selected print aspect ratio by printing onto photographic paper said original frame at a constant magnification, independently of the selected print aspect ratio represented by said trimming data, said photographic print having a constant dimension in the direction of the width of said photographic paper, regardless of the selected print aspect ratio, wherein said photographic printer comprises a printing paper mask member for masking said photographic paper so as to leave a printing area having said selected print aspect ratio, said printing area being disposed in a printing light path.

12. A photographic system as claimed in claim 11, wherein said selecting means and said recording means are incorporated in said camera, whereas said reading means and printing means are incorporated in said photographic printer.

13. A photographic system as claimed in claim 12, wherein said photographic printer further comprises:
a film mask member for masking said original frame on both lateral sides thereof in accordance with said selected print aspect ratio indicated by said trimming data.

14. A photographic system as claimed in claim 13, wherein said photographic printer further comprises a transporting means for transporting said photographic paper by a distance after each printing, said distance being determined in accordance with said selected print aspect ratio.

15. A photographic system as claimed in claim 12, wherein said camera has an exposure opening for defining said original frame at a predetermined constant taking aspect ratio regardless of said selected print aspect ratio.

16. A photographic system as claimed in claim 15, wherein said camera has a viewfinder having a field of view, said field of view having an aspect ratio that corresponds to said predetermined constant taking aspect ratio, and masking means for masking both lateral sides of said field of view, in accordance with said selected print aspect ratio.

17. A photographic system as claimed in claim 16, wherein said masking means include a liquid crystal display dispose in an optical system of said viewfinder, and a driver for driving said liquid crystal display, said driver being controlled in accordance with said trimming signal.

18. A photographic system as claimed in claim 16, wherein said selecting means further include a mechanical switch and said masking means includes a pair of mechanical mask plates which are movable in cooperation with said mechanical switch.

19. A photographic system as claimed in claim 15, further including a photographic film cartridge containing a strip of photographic film, wherein said photographic film has at least a perforation for allocating a position to each original frame having said predetermined constant taking aspect ratio, and plural pairs of visible border marks previously recorded on the film for each original frame outside said original frame, one pair of said border marks being different from another pair, and indicating both lateral side border lines of one of a plurality of predetermined trimming ranges, each said trimming range corresponding to one of said predetermined print aspect ratios that is less than said taking aspect ratio.

20. A photographic system as claimed in claim 19, wherein said border marks include at least a pair of symbols or characters.

21. A photographic system as claimed in claim 19, wherein said trimming data further include a visible symbol or character which corresponds to one of said pairs of border marks that indicates one of said predetermined trimming ranges corresponding to said selected print aspect ratio.

22. A photographic system as claimed in claim 11, wherein said trimming data are photographically recorded on said film in a position allocated to each original frame.

23. A photographic system as claimed in claim 22, wherein said trimming data include a bar code.

24. A photographic system as claimed in claim 11, wherein there are a plurality of predetermined print aspect ratios, any one of which is selectable by said selecting means.

25. A photographic system as claimed in claim 11, wherein said recording means include a liquid crystal display and a light-emitting diode.

26. A photographic system as claimed in claim 11, wherein said selecting means include an electric switch for outputting a trimming signal corresponding to said selected print aspect ratio.

27. A camera comprising:
an exposure opening for defining an area for recording an original frame on photographic film, said original frame having a predetermined constant taking aspect ratio;

aspect ratio selecting means for selecting one of a plurality of predetermined print aspect ratios, including a full print aspect ratio which corresponds to said predetermined constant taking aspect ratio, and at least a trimming print aspect ratio which is less than said full print aspect ratio;

means for masking a field of view of a viewfinder only in a lateral direction symmetrically with respect to a centerline of the viewfinder in accordance with a print aspect ratio selected by said aspect ratio selecting means, said field of view originally having an aspect ratio equal to said predetermined constant taking aspect ratio, said masking means comprising masking elements disposed only at opposed lateral portions of said field of view and Spaced apart in a direction of film advance;

recording means for recording data as to said selected print aspect ratio for each original frame on a portion of said photographic film outside said original frame, so as to designate the making of a photographic print having said selected print aspect ratio, said photographic print being made either by printing the whole area of said original frame when said full print aspect ratio is selected, or by masking only both lateral sides of said original frame when said trimming print aspect ratio is selected.

28. The camera according to claim 27, wherein said masking means are operable to mask said field of view in accordance with at least two aspect ratios in addition to said aspect ratio equal to said predetermined constant taking aspect ratio.

29. The camera according to claim 28, wherein said masking means are operable to mask said field of view in aspect ratios having values of 1.5, 1.8 and 2.3.

30. A photographic printer for making photographic prints having different print aspect ratios from original frames which are recorded on photographic film at a constant taking aspect ratio, said photographic printer comprising:

reading means for reading data as to a print aspect ratio from said photographic film, said data being recorded by a camera for each original frame;

masking means for masking photographic paper on both lateral sides so as to leave a printing area having said print aspect ratio represented by said data read by said reading means, said printing area having a constant dimension in the direction of the width of said photographic paper regardless of said print aspect ratio;

printing means for printing said original frame within said printing area on said photographic paper at a constant magnification independently of the data as to the print aspect ratio read by said reading means, so as to make a photographic print having both said print aspect ratio and said constant dimension in the direction of the width of said photographic paper; and transporting means for transporting said photographic paper by an amount which varies in accordance with said print aspect ratio.

* * * * *